United States Patent
Yu et al.

(10) Patent No.: US 10,062,914 B2
(45) Date of Patent: Aug. 28, 2018

(54) APPARATUS AND METHOD FOR PREVENTING MOISTURE CONDENSATION

(71) Applicant: HYUNDAI MOTOR COMPANY, Seoul (KR)

(72) Inventors: Jung Han Yu, Yongin-si (KR); Jung Do Suh, Seoul (KR); Ju Han Kim, Yongin-si (KR); Duck Whan Kim, Seongnam-si (KR); Se Joon Im, Seoul (KR); Young Woo Noh, Guri-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 370 days.

(21) Appl. No.: 14/673,574

(22) Filed: Mar. 30, 2015

(65) Prior Publication Data

US 2016/0149237 A1 May 26, 2016

(30) Foreign Application Priority Data

Nov. 20, 2014 (KR) ........................ 10-2014-0162824

(51) Int. Cl.
*H01M 8/04* (2016.01)
*H01M 8/24* (2016.01)
*H01M 8/04223* (2016.01)
*H01M 8/0432* (2016.01)
*H01M 8/04537* (2016.01)
*H01M 8/04701* (2016.01)

(52) U.S. Cl.
CPC ..... *H01M 8/04268* (2013.01); *H01M 8/0432* (2013.01); *H01M 8/04223* (2013.01); *H01M 8/04552* (2013.01); *H01M 8/04701* (2013.01); *H01M 2250/20* (2013.01); *Y02T 90/32* (2013.01)

(58) Field of Classification Search
CPC ........................ H01M 8/04268; H01M 8/0432
See application file for complete search history.

(56) References Cited

U.S. PATENT DOCUMENTS

| 6,682,841 B1 * | 1/2004 | Armstrong ........ H01M 8/04014 429/423 |
| 2008/0090111 A1 * | 4/2008 | Kim .................. H01M 8/04007 429/429 |

(Continued)

FOREIGN PATENT DOCUMENTS

| JP | H08-330771 A | 12/1996 |
| JP | 2002-063925 A | 2/2002 |

(Continued)

OTHER PUBLICATIONS

Korean Office Action issued in corresponding Korean Patent Application No. 10-2014-0162824, dated Nov. 23, 2015.

*Primary Examiner* — Stephan Essex
(74) *Attorney, Agent, or Firm* — McDermott Will & Emery LLP

(57) ABSTRACT

An apparatus for preventing moisture condensation includes a fuel cell stack and an enclosure in which the fuel cell stack is disposed. A heater and a temperature sensor are provided in the enclosure. A controller is configured to control the heater to be turned on when an insulation resistance between the fuel cell stack and the enclosure is less than a preset resistance value. The controller controls the heater not to be turned on when a surface temperature of the enclosure measured by the temperature sensor exceeds a preset temperature.

9 Claims, 5 Drawing Sheets

(56) References Cited

U.S. PATENT DOCUMENTS

2010/0035110 A1* 2/2010 Lundblad ............ H01M 8/0247
429/483
2013/0200060 A1   8/2013 Yoshioka et al.
2016/0087293 A1* 3/2016 Yu ..................... H01M 8/04776
429/429

FOREIGN PATENT DOCUMENTS

| JP | 2003-008275 A | 1/2003 |
| KR | 10-1997-7000986 A | 2/1997 |
| KR | 10-2008-0103103 A | 11/2008 |
| KR | 10-1071769 A | 10/2011 |

* cited by examiner

APPARATUS AND METHOD FOR PREVENTING MOISTURE CONDENSATION

CROSS-REFERENCE(S) TO RELATED APPLICATIONS

The present application claims the benefit of priority to Korean Patent Application Number 10-2014-0162824 filed on Nov. 20, 2014, the entire contents of which application are incorporated herein for all purposes by this reference.

TECHNICAL FIELD

The present invention relate to apparatus and method for preventing moisture condensation which occurs inside a fuel cell stack.

BACKGROUND

A fuel cell system is an electric power generating system for converting chemical energy of a fuel directly into electrical energy. Generally, the fuel cell system includes a fuel cell stack for generating electrical energy. A fuel supply device supplies a fuel (i.e. hydrogen) to the fuel cell stack. An air supply device supplies oxygen in air, which is an oxidizing agent required for an electrochemical reaction, to the fuel cell stack. A heat and water management device radiates reaction heat of the fuel cell stack to outside of the system and controls an operating temperature of the fuel cell stack. The fuel cell system generates electricity as a result of the electrochemical reaction of oxygen included in the air and hydrogen which is the fuel, and discharges heat and water as by-products of the reaction.

The fuel cell stack applied to a fuel cell vehicle includes a plurality of unit cells sequentially arranged. Each unit cell includes a membrane-electrode assembly (MEA) disposed at the innermost part thereof. The membrane-electrode assembly includes an electrolyte membrane capable of transporting hydrogen ions (protons), and catalyst layers such as a cathode and an anode, which are coated on both sides of the electrolyte membrane such that hydrogen and oxygen can react with each other. In addition, a gas diffusion layer (GDL) is disposed at an exterior portion of the MEA, i.e. at the exterior portion in which the cathode and the anode are positioned. In addition, a separator, in which flow fields are formed to supply the fuel and the air to the cathode and the anode and to discharge water generated by the reaction, is positioned at an exterior of the GDL. In addition, an end plate is positioned at both ends of the stack so as to support the stacked cells.

In the stack, hydrogen and oxygen are ionized by chemical reactions by respective catalyst layers, such that an oxidation reaction generating hydrogen ions and electrons occurs at an electrode to which the hydrogen is supplied, and a reduction reaction generating water occurs at an electrode to which oxygen is supplied. Generally, a catalyst including a platinum catalyst and a cocatalyst, such as Ru, Co, and Cu, with a catalyst support made of a carbon material is usually used as an electrode catalyst in the fuel cell. That is, hydrogen is supplied to the anode (referred to as an oxidation electrode), and oxygen, i.e. air, is supplied to the cathode (referred to as a reduction electrode). Accordingly, the hydrogen supplied to the anode is resolved into hydrogen ions (protons) "H+" and electrons "e−" by the catalysts of the electrode layers configured at both sides of an electrolyte membrane. Then, among the hydrogen ions and electrons, only the hydrogen ions (protons) "H+" are selectively transferred to the cathode through an electrolyte membrane, which is a positive ion exchange membrane. Simultaneously with this, the electrons "e−" are transferred to the cathode through a gas diffusion layer, which is a conductor, and a separator. In the cathode, the hydrogen ions supplied through the electrolyte membrane and the electrons supplied through the separator meets oxygen in air, which is supplied to the cathode by an air supply device, and produces a reaction to generate water. The movement of hydrogen ions caused at this time causes flow of electrons through an external conducting wire to generate current, wherein heat in addition to water is incidentally generated.

In general, the stack is housed by an enclosure in order to physically protect the stack in which a high voltage is generated. However, because of moisture introduction through a crevice of the enclosure, moisture condensation by a temperature difference between inner air and outer air of the enclosure due to an exothermic reaction of the stack, leak of some moisture from the stack during operating of the stack, or the like, the components of the stack in the enclosure may be corroded, and an insulation resistance may be deteriorated.

The information disclosed in this Background section is only for enhancement of understanding of the general background of the disclosure and should not be taken as an acknowledgement or any form of suggestion that this information forms the prior art already known to a person skilled in the art.

SUMMARY

An aspect of the present inventive concept is directed to apparatus and method for preventing moisture condensation inside an enclosure of a fuel cell stack by heating the inside of a fuel cell on the basis of insulation resistance of a fuel cell vehicle or a difference between a surface temperature of the enclosure and a dew point temperature in the enclosure.

Other objects and advantages of the present invention can be understood by the following description, and become apparent with reference to the embodiments of the present inventive concept. Also, it is obvious to those skilled in the art to which the present disclosure pertains that the objects and advantages of the present disclosure can be realized by the means as claimed and combinations thereof.

In accordance with an embodiment of the present inventive concept, an apparatus for preventing moisture condensation includes a fuel cell stack and an enclosure in which the fuel cell stack is disposed. A heater and a temperature sensor are provided inside the enclosure. A controller is configured to control the heater to be turned on when an insulation resistance between the fuel cell stack and the enclosure is less than a preset resistance value. The controller controls the heater not to be turned on when a surface temperature of the enclosure measured by the temperature sensor exceeds a preset temperature.

The controller may be configured to turn on the heater t for a predetermined period of time when the insulation resistance between the fuel cell stack and the enclosure is less than the preset resistance value and when the surface temperature of the enclosure is equal to or less than the preset temperature.

The controller may be configured to turn on a warning device when the surface temperature of the enclosure measured by the temperature sensor exceeds the preset temperature.

The controller may be configured to determine whether an average voltage per cell of the fuel cell stack is greater than or equal to a first voltage when a starting-on signal of a vehicle is sensed, and to turn on the heater when the average voltage per cell of the fuel cell stack is greater than or equal to the first voltage.

The controller may be configured to turn on the heater when at least one of a vehicle stop signal and a fuel cell shut-down signal is sensed.

The controller may be configured to turn off the heater when the average voltage per cell of the fuel cell stack is less than the first voltage after the heater is turned on.

In accordance with another embodiment of the present inventive concept, an apparatus for preventing moisture condensation includes a fuel cell stack and an enclosure in which the fuel cell stack is disposed. A heater and a temperature sensor are provided inside the enclosure. A controller is configured to control the heater to be turned on when a dew point temperature in the enclosure measured by the temperature sensor is greater than or equal to a surface temperature of the enclosure. The controller controls the heater not to be turned on when the surface temperature of the enclosure exceeds a preset temperature.

The controller may be configured to turn on the heater for a predetermined period of time when the dew point temperature in the enclosure is greater than or equal to the surface temperature of the enclosure and when the surface temperature of the enclosure is equal to or less than the preset temperature.

The controller may be configured to turn on a warning device when the surface temperature of the enclosure measured by the temperature sensor exceeds the preset temperature.

The controller may be configured to determine whether an average voltage per cell of the fuel cell stack is greater than or equal to a first voltage when a starting-on signal of a vehicle is sensed, and to control the heater to be turned on when the average voltage per cell of the fuel cell stack is greater than or equal to the first voltage.

The controller may be configured to turn on the heater when at least one of a vehicle stop signal and a fuel cell shut-down signal is sensed.

The controller may be configured to control the heater to be turned off when the average voltage per cell of the fuel cell stack is less than the first voltage after the heater is turned on.

In accordance with yet another embodiment of the present inventive concept, a method for preventing moisture condensation, comprising steps of measuring an insulation resistance between a fuel cell stack and an enclosure. Whether the insulation resistance is less than a preset resistance value is determined. Whether a surface temperature of the enclosure measured by a temperature sensor exceeds a preset temperature is determined. A heater is controlled to be turned on for a predetermined period of time when the surface temperature of the enclosure does not exceed the preset temperature. A warning device is controlled to be turned on when the surface temperature of the enclosure exceeds the present temperature.

According to the method for preventing moisture condensation, having the configuration as described above, moisture condensation in the enclosure for the fuel cell stack is suppressed, so that an accident due to deterioration of electrical insulation resistance can be prevented from occurring.

In addition, corrosion due to moisture condensation in the enclosure can be prevented.

In addition, since a high voltage can be rapidly removed during starting or stopping of the stack, deterioration of catalyst due to high-voltage formation is delayed to improve the durability of the stack.

DETAILED DESCRIPTION OF EMBODIMENTS

Figure 1:
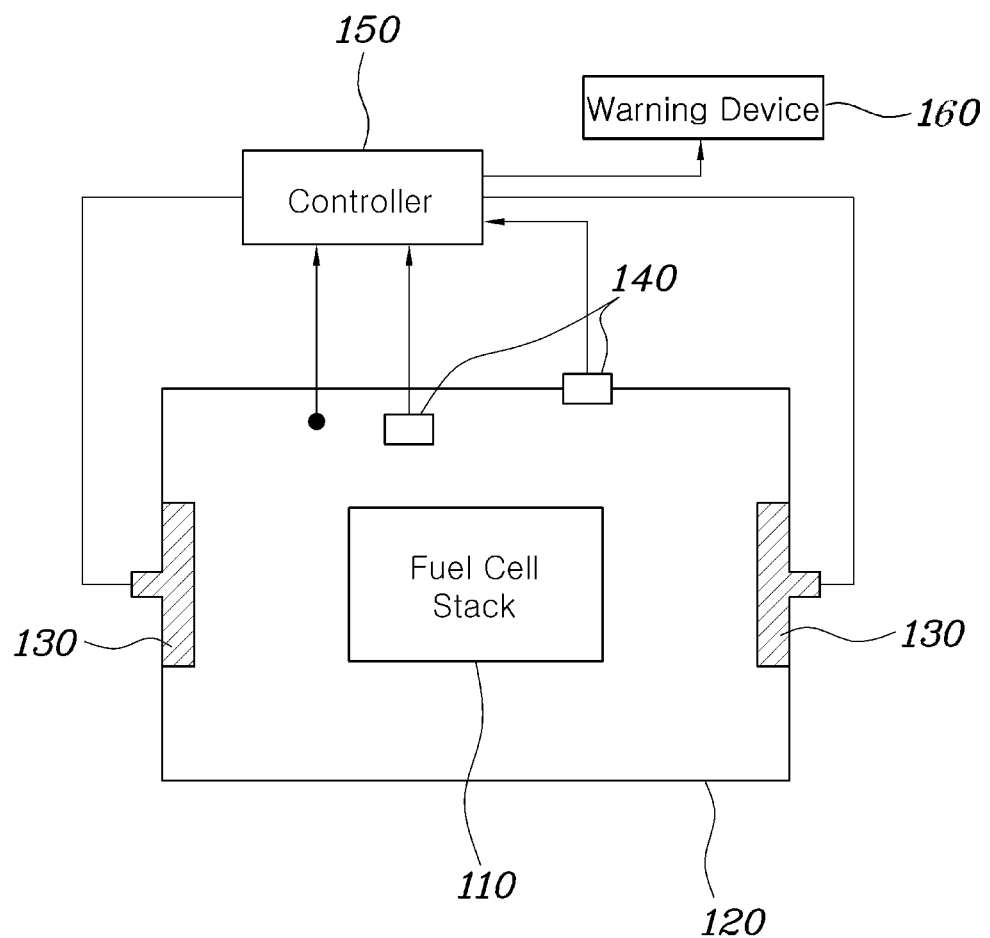
FIG. 1 is a block diagram illustrating a configuration of an apparatus for preventing moisture condensation in accordance with an embodiment of the present inventive concept.

Apparatus and method for preventing moisture condensation in accordance with exemplary embodiments of the present inventive concept will be described below in more detail with reference to the accompanying drawings. The present inventive concept may, however, be embodied in different forms and should not be construed as limited to the embodiments set forth herein. Rather, these embodiments are provided so that this disclosure will be thorough and complete, and will fully convey the scope of the present disclosure to those skilled in the art. Throughout the disclosure, like reference numerals refer to like parts throughout the various figures and embodiments of the present inventive concept. FIG. 1 is a block diagram illustrating the configuration of an apparatus for preventing moisture condensation in accordance with an embodiment of the present inventive concept.

Referring to FIG. 1, in accordance with a first embodiment of the present inventive concept, an apparatus for preventing moisture condensation may include a fuel cell stack 110 and an enclosure 120 containing the fuel cell stack 110. A heater 130 and a temperature sensor 140 are provided in the enclosure 120. A controller 150 is configured to control the heater 130 to be turned on when an insulation resistance between the fuel cell stack 110 and the enclosure 120 is less than a preset resistance value. The controller 150 controls the heater 130 not to be turned on when a surface temperature of the enclosure 120 measured by the temperature sensor 140 exceeds a preset temperature.

In this case, when the insulation resistance between the fuel cell stack 110 and the enclosure 120 is less than the preset resistance value and the surface temperature of the enclosure 120 does not exceed the preset temperature, the controller 150 may control the heater 130 to be turned on for a predetermined period of time. In addition, when the surface temperature of the enclosure 120 measured by the temperature sensor 140 exceeds the preset temperature, the controller 150 may control a warning device 160 to be turned on.

The enclosure 120 has an air inlet end (not shown) and an outlet end (not shown) for internal air circulation. In this case, the air circulation through the enclosure 120 may be performed using a pressure difference between inside and outside, or may be forcibly performed by a motor, an air compressor, or a blower.

The heater 130 is provided on an inner surface of the enclosure 120, and may include a heating resistor, such as a positive thermal coefficient (PTC) heater.

In accordance with an embodiment of the present inventive concept, the controller 150 measures the insulation resistance between the fuel cell stack 110 and the enclosure 120 since the insulation resistance is influenced by moisture inside the enclosure 120. When the moisture in the enclosure is condensed, the insulation resistance is lowered. Therefore, when an insulation resistance equal to or less than a predetermined level is measured during driving of a vehicle, the heater 130 is controlled to be turned on for a predetermined period of time, thus preventing and reducing the moisture condensation in the enclosure 120 in order to recover a predetermined level of insulation resistance. An insulation resistance regulation prescribes 100 ohms/Vdc in ECE R100, RMVSS 305. Therefore, the preset resistance value in the present disclosure may be set to 100 ohms/Vdc+a (wherein "a" represents a margin for taking safety of electricity into consideration).

When the surface temperature of the enclosure 120 is higher than the preset temperature, which is a surface limit temperature of the enclosure 120, during heating, the controller 150 may not turn on the heater 130 and may turn on the warning device to notify a driver of a dangerous situation because the decrease of the insulation resistance is caused by not moisture condensation but by another matter to bring another danger of accident due to overheat. Generally, the preset temperature may be set to less than 100° C.

When sensing a starting-on signal of the vehicle, the controller 150 may determine whether or not an average voltage per cell of the fuel cell stack 110 is greater than or equal to a first voltage, and may turn on the heater 130 when the average voltage per cell of the fuel cell stack 110 is greater than or equal to the first voltage.

If a fuel cell vehicle is a parking state for a long period of time, the moisture condensation may occur due to moisture introduced into the fuel cell stack 110 and due to a temperature difference between the stack enclosure 120 and ambient air. In this case, when hydrogen and air are supplied to drive the vehicle, a stack catalyst and stack durability may deteriorate due to sharp high-voltage formation.

For this reason, when the average voltage per cell of the fuel cell stack 110 is greater than or equal to the first voltage during starting of a vehicle, the controller 150 determines that the vehicle is in a state in which a high voltage has been formed, and controls the heater 130 mounted in the enclosure 120 to be tuned on so as to function as an exothermic body. Accordingly, when the fuel cell vehicle starts, an unnecessary high voltage can be removed to ensure the durability of the fuel cell stack 110, and the temperature of the enclosure 120 can increase to remove condensed moisture.

In addition, when a vehicle stop signal and/or a shut-down signal for fuel cells are sensed, the controller 150 may turn on the heater 130. This is because a cooling velocity of the surface temperature of the enclosure 120 and a cooling velocity of the ambient air temperature in the fuel cell stack 110 are different from each other, such that a local dew point in the enclosure 120 is higher than the temperature of the inner surface of the enclosure 120 when the fuel cell vehicle stops or shuts down, thereby causing the moisture condensation. In addition, unreacted hydrogen and air are remained in the fuel cell stack 110, and thus, the high voltage may occur.

Therefore, the controller 150 turns on the heater 130 in the enclosure 120 so as to function as an exothermic body, and thus, the high voltage caused by hydrogen and air in the fuel cell stack 110 can be removed to improve durability of the fuel cell stack 110. In addition, the exothermic action of the heater 130 dries the inside of the enclosure 120, so that a moisture condensation phenomenon can be prevented.

When the average voltage per cell of the fuel cell stack 110 is equal to or less than the first voltage after the heater 130 has been turned on, the controller 150 controls the heater 130 to be turned off.

For example, since a reverse voltage of cells may occur when the average voltage per cell of the fuel cell stack 110 is equal to or less than 0.1 V, the heater 130 is turned off in order to prevent the reverse voltage of the stacked cells.

In accordance with a second embodiment of the present inventive concept, an apparatus for preventing moisture condensation may include a fuel cell stack 110 and an enclosure 120 containing the fuel cell stack 110 therein. A heater 130 and a temperature sensor 140 are provided in the enclosure 120. A controller 150 is configured to control the heater 130 to be turned on when a dew point temperature in the enclosure 120 measured by the temperature sensor 140 is greater than or equal to a surface temperature of the enclosure 120, or the controller 150 controls the heater 130 not to be turned on when the surface temperature of the enclosure 120 exceeds a preset temperature.

When the dew point temperature in the enclosure 120 is greater than or equal to the surface temperature of the enclosure 120, and the surface temperature of the enclosure 120 does not exceed the preset temperature, the controller 150 turns on the heater 130 for a predetermined period of time. In contrast, when the surface temperature of the enclosure 120 exceeds a preset temperature, the controller 150 may control a warning device 160 to be turned on.

The temperature sensor 140 may be provided to be plural in number. Specifically, the temperature sensor 140 may be provided between the fuel cell stack 110 and the enclosure 120 so as to measure the dew point temperature, and may be provided on an inner surface of the enclosure 120 so as to measure the surface temperature of the enclosure 120.

According to the second embodiment of the present inventive concept, the controller 150 measures the dew point temperature in the enclosure 120 and the surface temperature of the enclosure 120 using the temperature sensor 140, and compares the measured temperatures to determine whether moisture remained in the enclosure 120 is condensed due to a temperature difference between the surface of the enclosure 120 and air surrounding the enclosure 120. Accordingly, when the dew point temperature in the enclosure 120 is greater than or equal to the surface temperature of the enclosure 120 during driving of the vehicle, the controller 150 determines that the moisture in the enclosure 120 is condensed and turns on the heater 130.

Similarly, in the second embodiment of the present inventive concept, when a starting-on signal of the vehicle is sensed, the controller 150 determines whether or not an average voltage per cell of the fuel cell stack 110 is greater than or equal to a first voltage and may turn on the heater 130 when the average voltage per cell of the fuel cell stack 110 is greater than or equal to the first voltage. In addition, the controller 150 may turn on the heater 130 when a vehicle stop signal and/or a shut-down signal for fuel cells are sensed. The controller 150 may turn off the heater 130 when the average voltage per cell of the fuel cell stack 110 is equal to or less than the first voltage after the heater 130 has been turned on.

Figure 2:
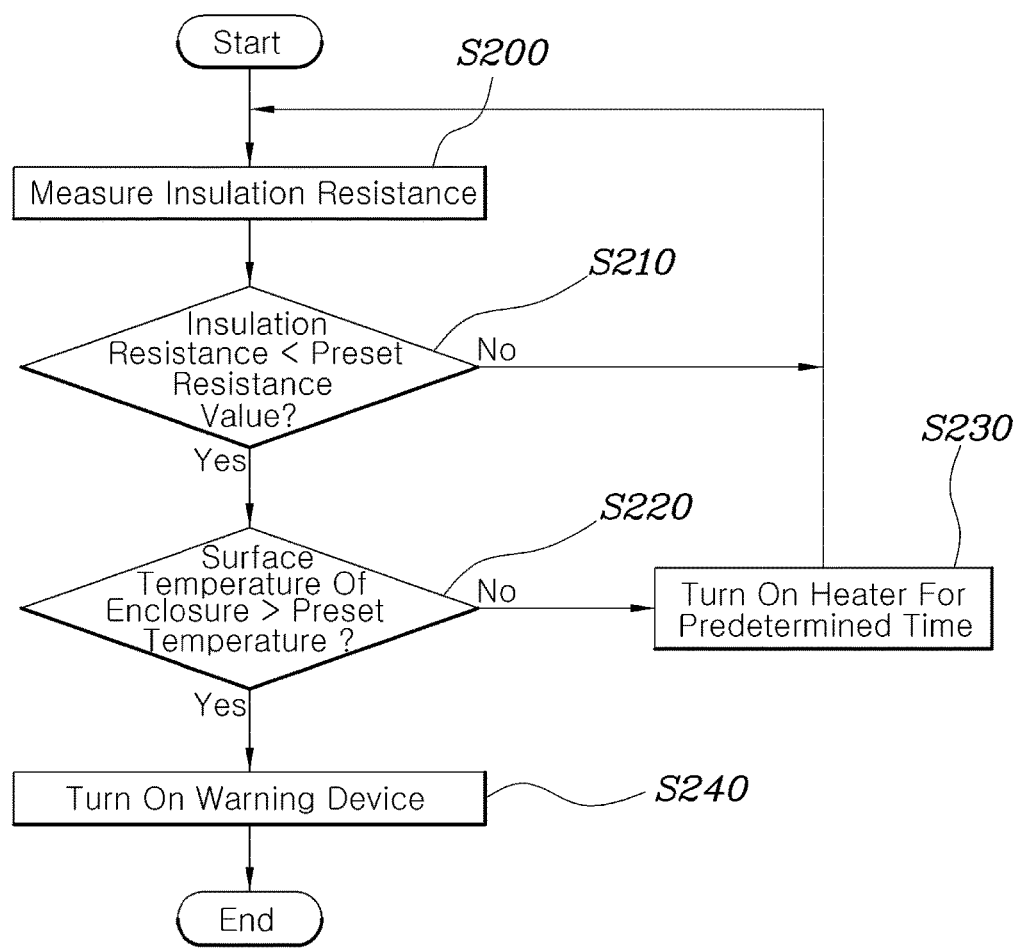
FIG. 2 is a flowchart illustrating a method for preventing moisture condensation during traveling of a vehicle in accordance with a first embodiment of the present inventive concept.
Figure 3:
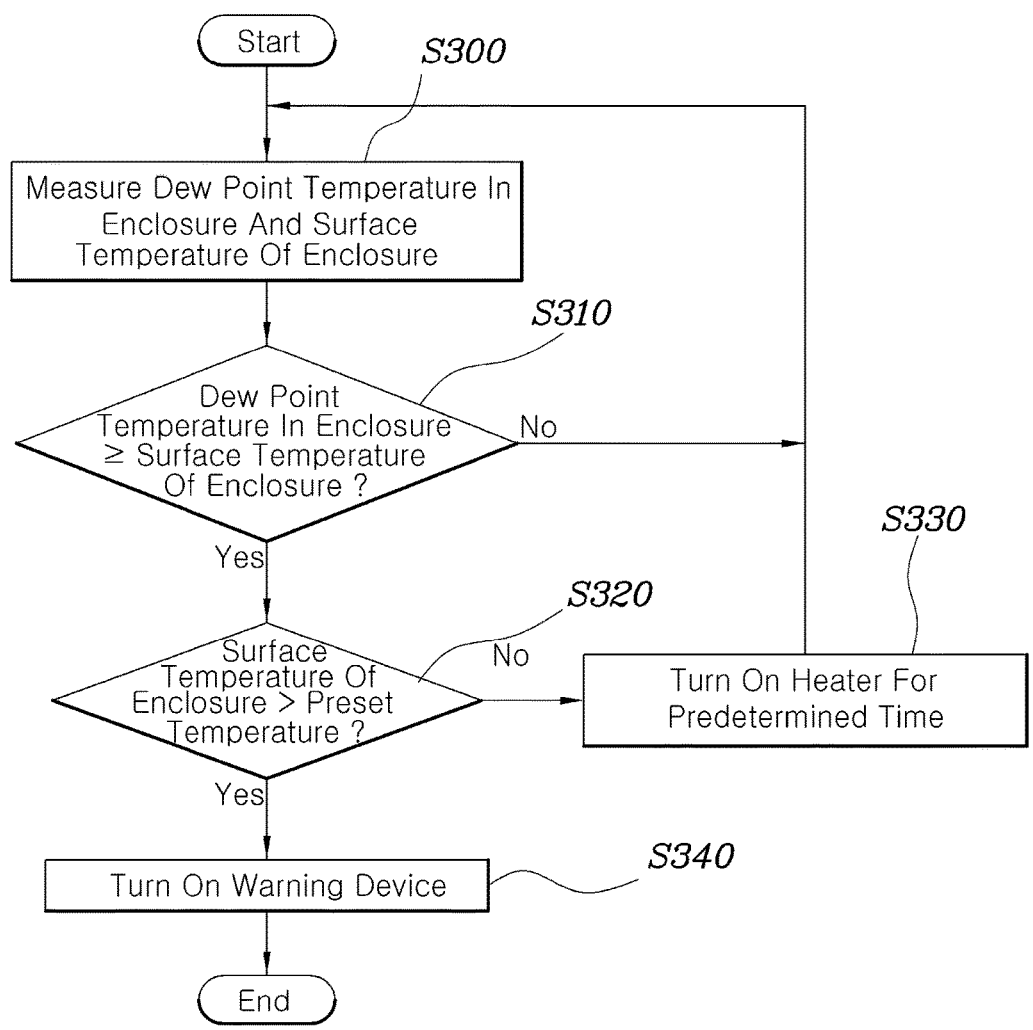
FIG. 3 is a flowchart illustrating a method for preventing moisture condensation during traveling of a vehicle in accordance with a second embodiment of the present inventive concept.
Figure 4:
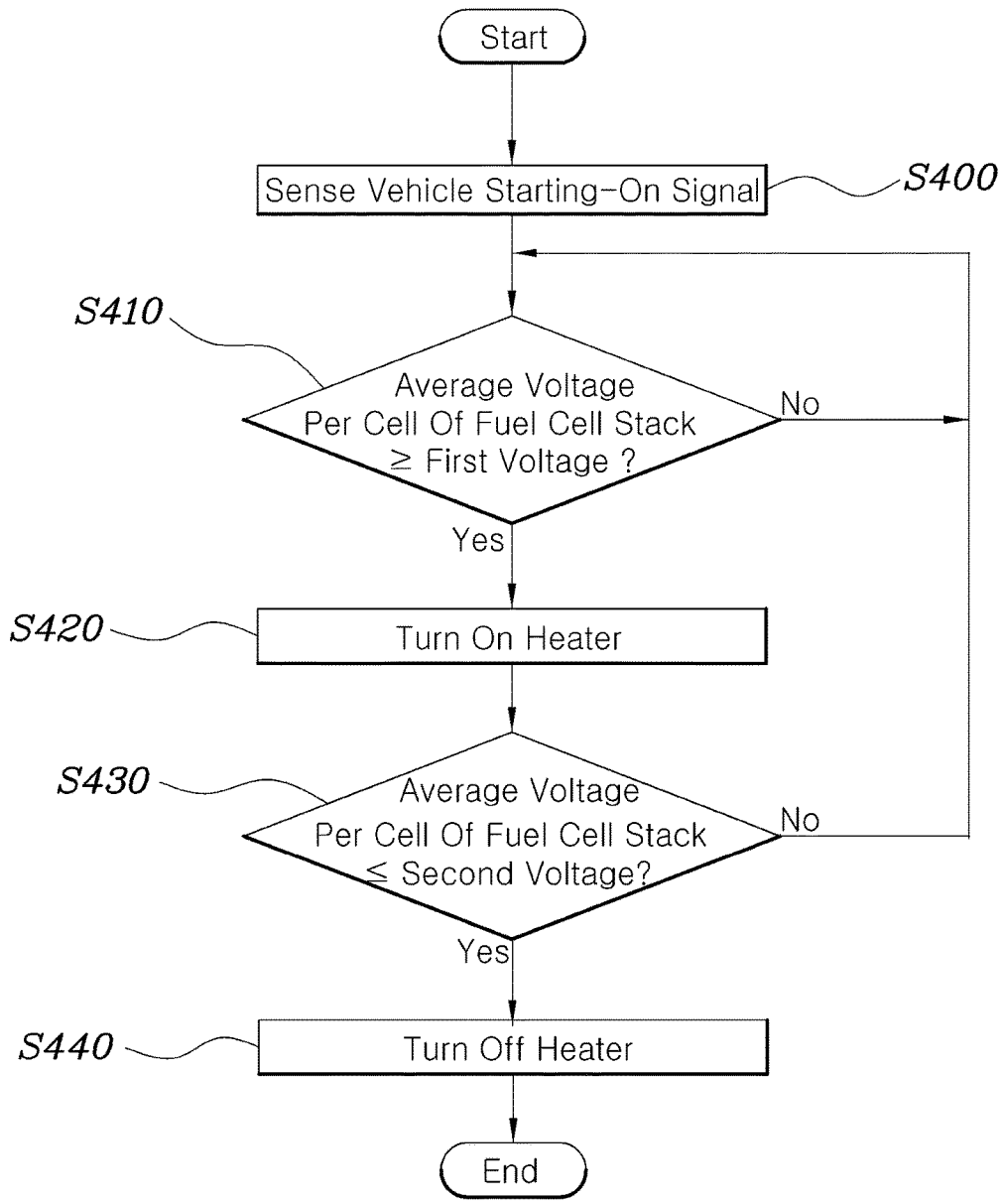
FIG. 4 is a flowchart illustrating a method for preventing moisture condensation during starting of a vehicle in accordance with an embodiment of the present inventive concept.
Figure 5:
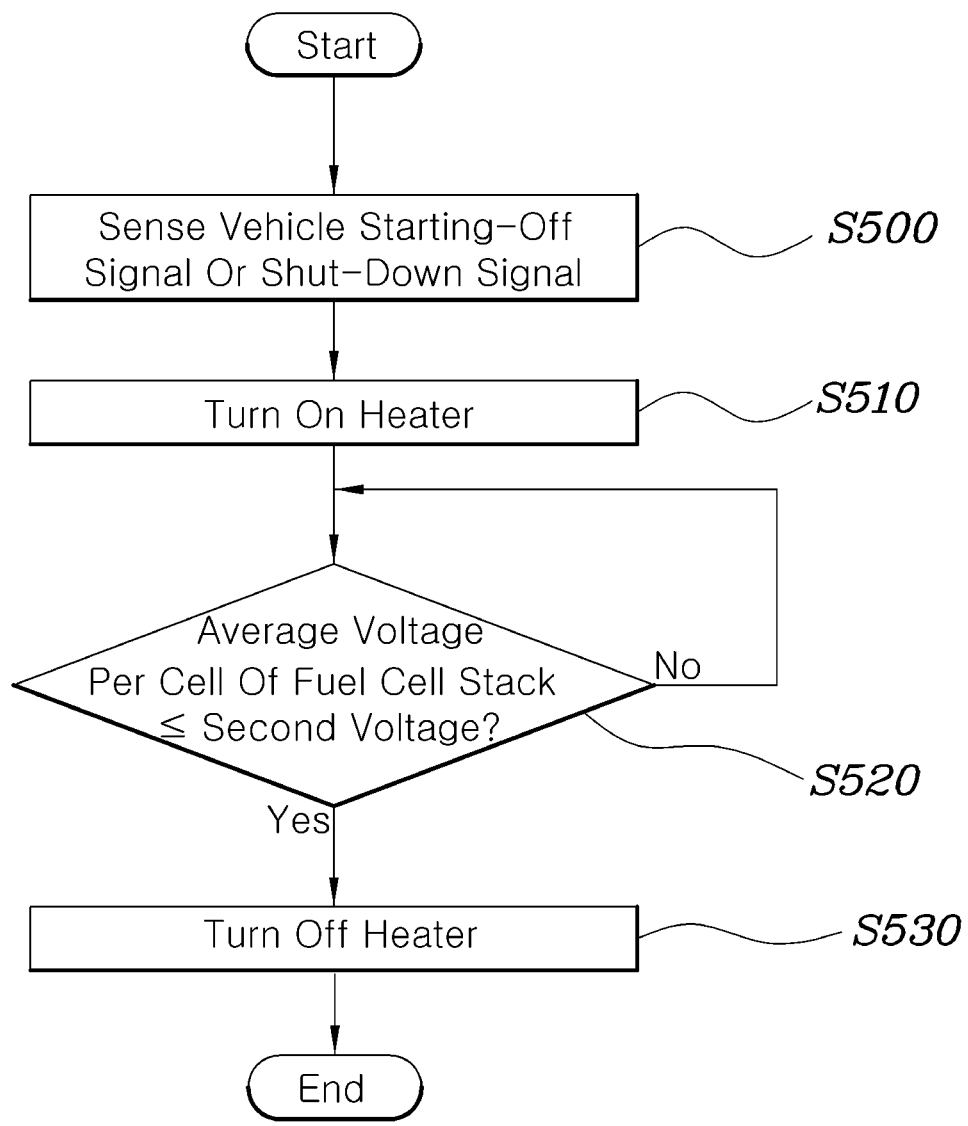
FIG. 5 is a flowchart illustrating a method for preventing moisture condensation when starting of a vehicle is interrupted or when a fuel cell shuts down in accordance with an embodiment of the present inventive concept.

Hereinafter, a method for preventing moisture condensation in accordance with exemplary embodiments of the present inventive concept will be described in more detail with reference to the accompanying drawings. FIG. 2 is a flowchart illustrating a method for preventing moisture condensation during traveling of a vehicle in accordance with a first embodiment of the present inventive concept. FIG. 3 is a flowchart illustrating a method for preventing moisture condensation in accordance with a second embodiment of the present inventive concept. FIG. 4 is a flowchart illustrating a method for preventing moisture condensation during starting of a vehicle in accordance with an embodiment of the present inventive concept. FIG. 5 is a flowchart illustrating a method for preventing moisture condensation when the starting of a vehicle is interrupted or when a fuel cell shuts down in accordance with an embodiment of the present inventive concept.

Referring to FIGS. 2 to 5, in accordance with the first embodiment of the present inventive concept, a method for preventing moisture condensation may include measuring an insulation resistance between the fuel cell stack 110 and the enclosure (S200). Whether or not the insulation resistance is less than a preset resistance value is determined (S210). Whether or not a surface temperature of the enclosure 120 measured by the temperature sensor 140 exceeds a preset temperature is determined when the insulation resistance is less than the preset resistance value (S220). The heater 130 is controlled to be turned on for a predetermined period of time when the surface temperature of the enclosure 120 does not exceed the preset temperature (S230). The warning device 160 is controlled to be turned on when the surface temperature of the enclosure 120 exceeds the preset temperature (S240).

In addition, in accordance with the second embodiment of the present inventive concept, a method for preventing moisture condensation may include measuring a dew point temperature in the enclosure 120 and a surface temperature of the enclosure 120 (S300). Whether or not the measured dew point temperature in the enclosure 120 is greater than or equal to the surface temperature of the enclosure 120 is determined (S310). Whether or not the surface temperature of the enclosure 120 measured by the temperature sensor 140 exceeds a preset temperature is determined when the dew point temperature in the enclosure 120 is greater than or equal to the surface temperature of the enclosure 120 (S320). The heater 130 is controlled to be turned on for a predetermined period of time when the surface temperature of the enclosure 120 does not exceed the preset temperature (S330). The warning device 160 is controlled to be turned on when the surface temperature of the enclosure 120 exceeds the preset temperature (S340).

When the vehicle starts, the method for preventing moisture condensation may include sensing a starting-on signal of the vehicle (S400). Whether or not the average voltage per cell of the fuel cell stack 110 is greater than a first voltage is determined when the starting-on signal has been sensed (S410). The heater 130 is controlled to be turned on for a predetermined period of time when the average voltage per cell of the fuel cell stack 110 is greater than the first voltage (S420). Whether or not the average voltage per cell of the fuel cell stack 110 is equal to or less than a second voltage is determined after the heater 130 has been turned on (S430). The heater 130 is controlled to be turned off when the average voltage per cell of the fuel cell stack 110 is equal to or less than the second voltage (S440).

When the vehicle stops or shuts down, the method for preventing moisture condensation may include sensing a vehicle stop signal or a shut-down signal (S500). The heater 130 is controlled to be turned on when the stop signal or the shut-down signal has been sensed (S510). Whether or not the average voltage per cell of the fuel cell stack 110 is equal to or less than a second voltage is determined after the heater 130 has been turned on (S520). The heater 130 is controlled to be turned off when the average voltage per cell of the fuel cell stack 110 is equal to or less than the second voltage (S530).

According to the method for preventing moisture condensation as described above, the moisture condensation in the enclosure for the fuel cell stack is suppressed, so that an accident due to deterioration of electrical insulation resistance can be prevented from occurring.

In addition, corrosion due to the moisture condensation in the enclosure can be prevented.

In addition, since a high voltage can be rapidly removed during starting or stopping of the stack, deterioration of catalyst due to high-voltage formation is delayed to improve the durability of the stack.

While the present inventive concept has been described with respect to the specific embodiments, it will be apparent to those skilled in the art that various changes and modifications may be made without departing from the spirit and scope of the disclosure as defined in the following claims.

What is claimed is:

1. An apparatus for preventing moisture condensation, comprising:
    a fuel cell stack;
    an enclosure in which the fuel cell stack is disposed;
    a heater and a temperature sensor provided inside the enclosure; and
    a controller configured to control the heater to be turned on when an insulation resistance between the fuel cell stack and the enclosure is less than a preset resistance value,
    wherein the controller controls the heater not to be turned on when a surface temperature of the enclosure measured by the temperature sensor exceeds a preset temperature.

2. The apparatus of claim 1, wherein the controller is configured to turn on the heater for a predetermined period of time when the insulation resistance between the fuel cell stack and the enclosure is less than the preset resistance value and when the surface temperature of the enclosure is equal to or less than the preset temperature.

3. The apparatus of claim 1, wherein the controller is configured to turn on a warning device when the surface temperature of the enclosure measured by the temperature sensor exceeds the preset temperature.

4. The apparatus of claim 1, wherein the controller is configured to determine whether an average voltage per cell of the fuel cell stack is greater than or equal to a first voltage when a starting-on signal of a vehicle is sensed, and to turn on the heater when the average voltage per cell of the fuel cell stack is greater than or equal to the first voltage.

5. The apparatus of claim 1, wherein the controller is configured to turn on the heater when at least one of a vehicle stop signal and a fuel cell shut-down signal is sensed.

6. The apparatus of claim 4, wherein the controller is configured to turn off the heater when the average voltage per cell of the fuel cell stack is less than the first voltage after the heater is turned on.

7. The apparatus of claim 1, wherein the temperature sensor may be provided to be plural in number.

8. The apparatus of claim 1, wherein the heater may be provided to be plural in number.

9. The apparatus of claim 1, wherein the enclosure has an air inlet end an outlet end to circulate air there inside.

* * * * *